(Model.)

2 Sheets—Sheet 1.

W. LOUDEN.
HAY SLING.

No. 539,524. Patented May 21, 1895.

Witnesses.
C. J. Fulton
R. B. Louden

Inventor:
William Louden (Model.) 2 Sheets—Sheet 2.
W. LOUDEN.
HAY SLING.
No. 539,524. Patented May 21, 1895.
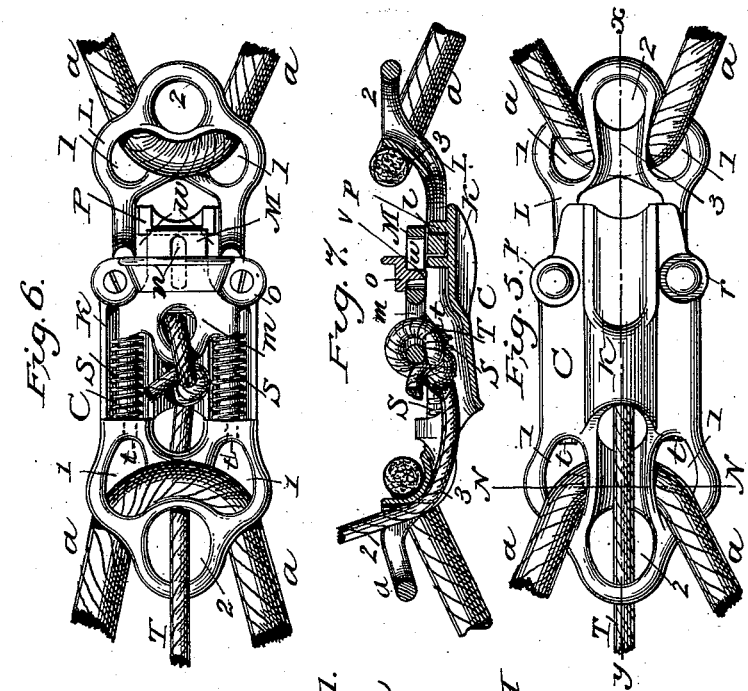
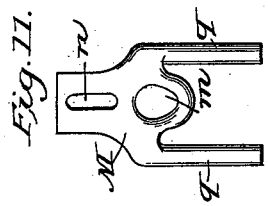
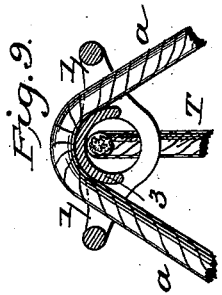
Witnesses 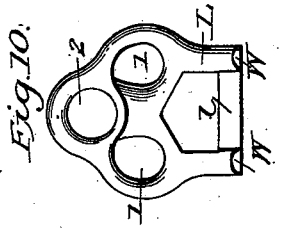 Inventor
C. J. Fulton William Louden

UNITED STATES PATENT OFFICE.

WILLIAM LOUDEN, OF FAIRFIELD, IOWA.

HAY-SLING.

SPECIFICATION forming part of Letters Patent No. 539,524, dated May 21, 1895.

Application filed April 18, 1893. Serial No. 470,920. (Model.)

*To all whom it may concern:*

Be it known that I, WILLIAM LOUDEN, a citizen of the United States, residing at Fairfield, in the county of Jefferson and State of Iowa, have invented a new and useful Improvement in Hay-Slings, of which the following is a specification.

This invention relates to hay slings designed to roll up the hay (or other similar material to be elevated) into a bundle, and to discharge the same when carried to the proper place; and it consists in using springs to cause the sling to straighten out automatically after its load is discharged; also of an improved trip coupling to hold the sections of the sling together, and to disconnect them when desired, and in other improvements in details which are hereinafter set forth.

Figure 1:
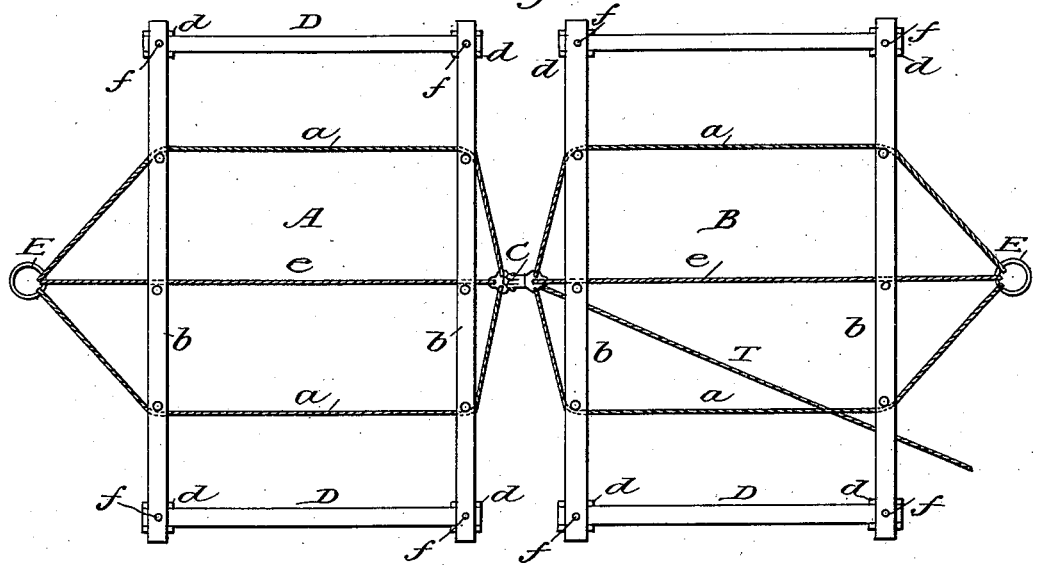
Figure 2:
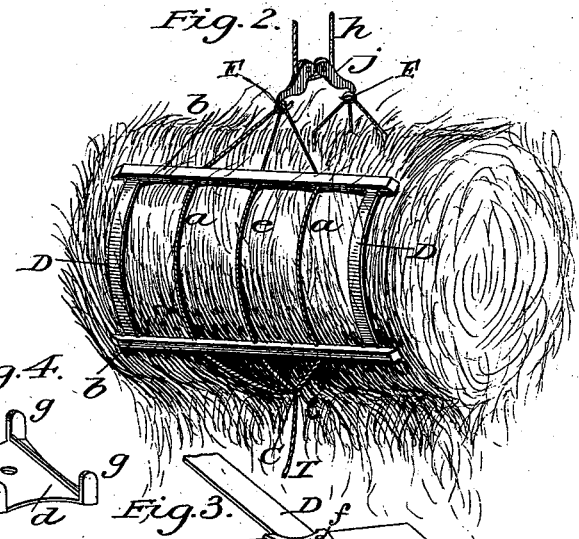
Figure 4:
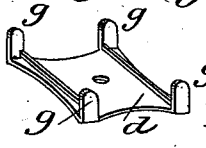
Figure 3:
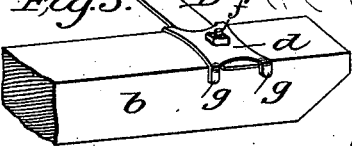

In the accompanying drawings, representing the invention, Figure 1 is a top or plan view of the sling spread to receive its load. Fig. 2 is a perspective showing the sling rolled up with its load. Fig. 3 is an under side view of one of the ends of the spreader, showing the attachment of the spring. Fig. 4 is an inside view of one of the spring-caps. Fig. 5 is a top view of the trip-coupling, showing the attachment of the side ropes and trip-cord, the center ropes $e$ being left off. Fig. 6 is an under side view of the same. Fig. 7 is a vertical section drawn on the line $x\,y$ of Fig. 5, the coupling being turned bottom side up. Figs. 8, 9, 10, and 11 are detail views.

The sling shown in Figs. 1 and 2 is composed of two sections A and B made preferably alike, and coupled together by the trip coupling C. The sections are composed principally of the spreaders $b$, side ropes $a$, and center ropes $e$, the ropes being connected to the trip coupling C at their inner ends and to the rings E at their outer ends.

Connected to the ends of the spreaders $b$, are flat springs D, preferably made of steel, and applied to the lower sides of the spreaders $b$, and held in place by means of bolts $f$ passing through the spreaders $b$, and caps $d$, as more particularly shown in Fig. 3. The caps $d$ are fitted with prongs or flanges $g$ at each corner as shown in Fig. 4, which are adapted to fit over the edges of the spring D, and also the edges of the spreaders $b$.

The object of the springs is to cause the sling or sections thereof, to assume a straight position as soon as its load is discharged and thus facilitate spreading it for another load. In elevating the load it will be rolled up by the hoisting rope $h$, and pulleys $j$, as shown in Fig. 2, and when the spreaders are connected together by ropes alone in the ordinary way, the empty sling will come down in a heap and frequently all tangled up, so as to require time and labor to straighten it out. By using springs applied to the spreaders, as I have indicated, this trouble will be obviated.

While the springs have sufficient flexibility to permit the load to be rolled up, as shown in Fig. 2, they also have sufficient rigidity to straighten out the sling and prevent it from getting tangled when the load is discharged. The caps $d$ being provided with prongs or flanges $g$ to fit the edges of the springs, and also the edges of the spreaders, will hold each section of the sling in its proper rectangular form.

As shown in the drawings the springs D are also used to take the place of ropes which have heretofore been used to hold the ends of the spreaders together. However, this is not a necessary limitation of my invention. The springs may be applied to the middle of the spreaders $b$, to any intermediate part thereof, and in addition to the ropes generally used if so desired, or in any other suitable manner.

The trip coupling C is composed of the main casting K, coupling loop L, trip plate M, and keeper O to hold the trip-plate in place. The main casting K has a lip or shoulder P formed on one of its sides, which has its inner face set at almost right angles to the plane of the casting. The end $l$ of the coupling loop L, is made so that its inner face will fit the inner face of the shoulder P. The end $l$ of the coupling loop being pressed against the end of the trip plate M will push the loop back until it drops in behind the shoulder P, when the coiled springs S on the forked ends of the trip plate M will force it back again so as to hold the coupling loop behind the shoulder P as shown in Figs. 6 and 7.

A trip cord T is fastened into the eye $m$ of the trip plate M. A pull on the trip cord will withdraw the plate from over the end $l$ of the coupling loop and permit it to slip off of the shoulder P, the adjoining faces of the two parts being sloping enough to accomplish this result. By this means the sling may be coupled together and uncoupled at will. While coupled, it will be held securely together, and there being very little pressure of the coupling loop L against the trip plate M, it will be very easily and promptly uncoupled to discharge the load.

The forked end of the trip plate M slides in holes $t$ in the main casting as shown in Figs. 6 and 7. Each of the forked ends being fitted with a coiled spring S which bears against the casting surrounding these holes, the plate M will always hold the coupling loop in position, and should one spring become broken the other will remain to operate the plate.

The keeper O which holds the plate in place is preferably riveted to a projecting base $r$ on the main casting, and this base $r$ also forms a stop for the end $l$ of the coupling loop. The main end of the plate M has a slot $n$ which fits over the pin $v$ formed on the inner side of the keeper O. This serves to limit the movement of the plate M, and to prevent it from being drawn out far enough to cramp the springs. The end $l$ of the coupling loop is fitted with prongs $w$ which fit against the keeper O to prevent it from getting twisted around while locked to the main casting K.

The outer ends of the main casting K and the coupling loop L are fitted with eyes 1 for the attachment of the ropes $a$; also with eyes 2 to which the center ropes $e$ are connected. The parts of the casting K, and also of the coupling loop L in which the eyes 1 are formed are set obliquely, and below the plane of the central part of the coupling. By this means the ropes $a$ will not be bent much (if any) in passing through the eyes 1, and will be in line with the trip mechanism. The casting K and coupling loop L will not therefore be by the strain of the ropes out of line with each other, as they would be if both ends and central parts of the coupling were all set substantially in the same plane.

Between the eyes 1 is an arcuated partition 3 made convex in cross section on its lower or concave side, and concave in cross section on its upper or convex side its upper side forming a guide way to the eye 2. The ropes $a$ in being passed around its concave side, will have a smooth rounded surface to bear against, while the trip cord T will have a groove to hold it in place as it passes over its convex side to the eye 2. By this means the amount of metal required to form the eyes is reduced to a minimum, and the form best adapted for the connection of the sling ropes is secured. One of the eyes being also adapted to form a guide loop for the trip cord T, no extra loop is required for this purpose.

The working parts of my trip coupling are all in the under side of the main casting K and completely shielded from the interference of the material loaded on the sling, and not liable to catch on adjacent objects, thus producing a very simple, easily operated and reliable trip coupling for a hay sling.

Having thus described my invention, what I desire to secure by Letters Patent is—

1. A hay sling adapted to be rolled up to compress the hay and having a spring connection to cause it to unroll, substantially as and for the purpose set forth.

2. A hay sling having spreader connections and springs secured to the spreaders to cause it to unroll, substantially as and for the purpose set forth.

3. A hay sling composed principally of ropes, spreaders to hold the ropes apart and springs connected to the spreaders so as to cause the spring to unroll, substantially as set forth.

4. A hay sling made in two sections, each section composed principally of ropes, spreaders to hold the ropes apart, and springs secured to the spreaders in each section, substantially as and for the purpose set forth.

5. A hay sling having spreaders to hold the ropes apart in combination with springs applied to the spreaders and caps to hold the springs in place, the caps having prongs to straddle the springs and spreaders and hold them at right angles to each other, substantially as described.

6. A trip coupling having a frame with a shoulder formed on one of its faces, a coupling loop adapted to catch over said shoulder, and a trip plate adapted to project over said loop and means to hold the plate in said position.

7. A trip coupling having a frame with a shoulder formed on one of its faces, a coupling loop adapted to catch over said shoulder, a spring actuated trip plate adapted to project over said loop and a keeper to hold the plate in position, substantially as set forth.

8. A trip coupling having a frame with a shoulder formed on one of its faces, a coupling loop adapted to catch over said shoulder, a trip plate adapted to project over said loop and a keeper to hold the plate in position.

9. A trip coupling having a frame with a shoulder formed on one of its faces, a coupling loop adapted to catch over said shoulder, a trip plate adapted to project over said loop and a keeper to hold the plate in position, the loop being provided with prongs to rest against said keeper, substantially as set forth.

10. A trip coupling having a shoulder on its main frame, a coupling loop adapted to catch over said shoulder and a trip plate adapted to project over said loop and hold it in engagement with the shoulder, the back end of the trip plate being forked and fitted with coiled springs to encircle said forks.

11. A trip coupling having a series of eyes for the attachment of the sling ropes, and one of said eyes being adapted to also form a guide for the trip cord, substantially as set forth.

12. A trip coupling having eyes on its ends for the attachment of the sling ropes, the body of the coupling being arched and the eyes depressed so that the trip mechanism and the sling ropes will be placed in the same plane, substantially as and for the purpose set forth.

13. In hay slings a detachable coupling having eyes in the ends for the attachment of the ropes, and an arcuated partition between the eyes, the partition being convex in cross section on its concave side, and concave in cross section on its convex side, substantially as shown and described.

In testimony whereof I have signed this specification in the presence of two subscribing witnesses.

WILLIAM LOUDEN.

Witnesses:
W. H. BLOSS,
ISAAC PENCE.